(12) United States Patent
Garland et al.

(10) Patent No.: US 7,059,674 B2
(45) Date of Patent: Jun. 13, 2006

(54) BICYCLE SADDLE

(76) Inventors: Tylor Garland, 1074 S. Ogden St., Los Angeles, CA (US) 90019; Aldia Rauda, 695 Greenwich St., #5, San Francisco, CA (US) 94133; Geoffrey Craig Pittfield, 2849 Fillmore St. #1, San Francisco, CA (US) 94123

( * ) Notice: Subject to any disclaimer, the term of this patent is extended or adjusted under 35 U.S.C. 154(b) by 203 days.

(21) Appl. No.: 10/264,715

(22) Filed: Oct. 4, 2002

(65) Prior Publication Data

US 2004/0004375 A1 Jan. 8, 2004

Related U.S. Application Data

(60) Provisional application No. 60/394,341, filed on Jul. 3, 2002.

(51) Int. Cl.
*B62J 1/10* (2006.01)

(52) U.S. Cl. ....................... 297/204; 297/197; 297/202; 297/195.1; 297/284.2

(58) Field of Classification Search ................. 297/197, 297/202, 204, 195.1, 205, 207, 214, 284.2, 297/452.56

See application file for complete search history.

(56) References Cited

U.S. PATENT DOCUMENTS

| | | | |
|---|---|---|---|
| 253,504 A | 2/1882 | Burley | |
| 323,693 A | 8/1885 | Lamplaugh | |
| 415,253 A | 11/1889 | Pattisson | |
| 492,375 A | 2/1893 | Steers | |
| 507,413 A | 10/1893 | Broadbent | |
| 512,008 A | 1/1894 | Cavanaugh | |
| 515,966 A | 3/1894 | Pepper | |
| 534,326 A | 2/1895 | Garford | |
| 543,260 A | 7/1895 | Mesinger | |
| 544,625 A | 8/1895 | Montague | |
| 545,421 A | 8/1895 | Beach | |
| 578,426 A | 3/1897 | Smith | |
| 605,689 A | 6/1898 | Kirkpatrick | |
| 606,146 A | 7/1898 | Hunt | |
| 607,565 A | 7/1898 | Hunt | |
| 610,960 A | 9/1898 | Chapman | |
| 612,546 A | 10/1898 | Leimburg | |
| 623,505 A | 4/1899 | Avery | |
| 660,215 A | * 10/1900 | Harmon | ....................... 297/197 |
| 823,915 A | * 6/1906 | Brooks et al. | ............... 297/207 |
| 823,916 A | 6/1906 | Brooks et al. | |

(Continued)

FOREIGN PATENT DOCUMENTS

| | | |
|---|---|---|
| EP | 0508957 A1 | 10/1992 |
| FR | 819647 A1 | 10/1937 |
| FR | 2486014 A1 | 1/1982 |
| GB | 2268454 * | 1/1994 |
| WO | WO 9815424 A1 | 4/1998 |
| WO | WO 0224032 A1 | 3/2002 |

*Primary Examiner*—Laurie K. Cranmer
(74) *Attorney, Agent, or Firm*—GSS Law Group

(57) ABSTRACT

The invention includes a bicycle saddle whose seating surface is made of a stretched membrane, where the membrane is stretched into a vaulted shape from the nose extending at least partially through the rider's crotch toward the cantle at the rear of the seat. The invention further includes at least one carrier member acting upon the membrane to create, at least partly, the vaulted shape, and an attachment of at least part of a perimeter of the membrane to at least one of the carrier members. The attachment further provides the vaulted shape to the membrane and/or a tension to the membrane. The invention also further includes a saddle undercarriage attached to at least one of the carrier members providing at least part of the tension to the membrane, whenever the saddle undercarriage flexes. The saddle undercarriage is further comprised of a means for mounting to a seat post. An embodiment of the invention includes a ventilation path through the seating surface to the rider.

36 Claims, 11 Drawing Sheets

U.S. PATENT DOCUMENTS

| | | | |
|---|---|---|---|
| 1,512,145 A | | 10/1924 | Starck |
| 2,395,346 A | * | 2/1946 | Schwinn .................... 297/207 |
| 3,041,109 A | | 6/1962 | Eames et al. |
| 4,099,769 A | * | 7/1978 | Jacobs ....................... 297/204 |
| 4,367,896 A | | 1/1983 | Nieddu |
| 4,950,004 A | | 8/1990 | Sunshine |
| 5,013,089 A | | 5/1991 | Abu-Isa et al. |
| 5,015,034 A | * | 5/1991 | Kindig et al. ............... 297/227 |
| 5,340,192 A | * | 8/1994 | Hsh ........................... 297/197 |
| 5,387,024 A | * | 2/1995 | Bigolin ...................... 297/202 |
| 5,582,463 A | | 12/1996 | Linder et al. |
| 5,597,202 A | | 1/1997 | Andersen |
| 5,676,420 A | * | 10/1997 | Kuipers et al. ............. 297/204 |
| 5,791,730 A | | 8/1998 | Hoffacker |
| 5,823,618 A | * | 10/1998 | Fox et al. ................... 297/201 |
| 5,921,624 A | | 7/1999 | Wu |
| 5,927,802 A | * | 7/1999 | Kesinger .................... 297/204 |
| 6,035,901 A | | 3/2000 | Stumpf et al. |
| 6,039,395 A | | 3/2000 | Culbertson |
| 6,059,359 A | * | 5/2000 | Cassani .................. 297/195.1 |
| 6,059,368 A | | 5/2000 | Stumpf et al. |
| 6,106,059 A | | 8/2000 | Minkow et al. |
| 6,125,521 A | | 10/2000 | Stumpf et al. |
| 6,149,230 A | | 11/2000 | Bontrager |
| 6,231,122 B1 | | 5/2001 | Goldstein |
| 6,244,655 B1 | | 6/2001 | Minkow et al. |
| 6,290,291 B1 | | 9/2001 | Kojima |
| 6,494,540 B1 | | 12/2002 | Tornero |
| 6,666,507 B1 | | 12/2003 | Ringgard |

* cited by examiner

BICYCLE SADDLE

CROSS REFERENCE TO RELATED APPLICATIONS

This application claims benefit of United States provisional patent application Ser. No. 60/394,341, filed Jul. 3, 2002, the specification and drawings of which are hereby incorporated by reference in their entirety.

TECHNICAL FIELD

This invention relates generally to bicycle saddles and exercise bicycle saddles, and more particularly to a saddle whose seating surface is comprised primarily of a stretched, vaulted membrane.

BACKGROUND ART

Bicycles are pervasive, inexpensive, reliable and are used everyday throughout most of the world. This invention relates to innovations in the bicycle saddle. While bicycle saddles have seen improvements over the last century, there remain some fundamental problems that have resisted prior art attempts to solve them.

The inventors see the prior art teaching two primary types of bicycle saddles, which will be referred to herein as a traditional saddle and a modern saddle. U.S. Pat. No. 823,916 (Brooks, Holt) teaches making the traditional saddle by suspending leather between a cantle and nose. U.S. Pat. No. 6,244,655 (Minkow et al.) teaches making the modern saddle with a plastic shell, padding, and a seat cover of leather or plastic. Both saddle types typically incorporate suspension rails for mounting the saddle to the bicycle via a seat post, as taught in U.S. Pat. No. 5,466,042 (Herman).

Traditional leather suspension saddles, as exemplified by U.S. Pat. No. 823,916 (Brooks, Holt), tend to be particularly heavy due to the necessity of constructing them from thick leather and heavy metal assemblies. These tendencies have reduced their use as bicycles became increasingly lightweight.

Further, traditional leather saddles tend to wear out by stretching over time, resulting in the inclusion of bulky, heavy, tensioning screws in such saddle designs. The designs assume that the material used is ductile and has a memory, in other words that it is capable of maintaining a shape without support once formed into that shape, and that if flexed or bent within limits, the material will tend to return to that shape. Leather is a relatively inelastic material, which limits the extent to which the seating surface can yield under a rider's load and then return to its unloaded shape.

The leather acts as an additional layer of clothing, increasing the rider's perspiration and temperature which is undesirable in a physically demanding activity such as bicycling. Further, leather designs generally fail to provide adequate aeration to the rider, which is important as perspiration in the seat area results in chafing and discomfort to the rider.

Traditional leather saddles are primarily stretched longitudinally (along the front to rear axis), which limits the shapes that can be achieved, and to maintain saddle shape, a heavy grade of leather must be typically used. Innovation with modern materials has largely ceased due to the decline in popularity of leather saddles, with the result that the support carriages are frequently bulky, heavy, and inelegant. In addition, leather saddles frequently wear badly around their edges even with normal usage.

Modern saddles, as exemplified by U.S. Pat. No. 6,149,230 (Bontrager), are typically made of a plastic shell, deformable padding layers, and a seat cover of leather or plastic.

Modern saddles often suffer at least from the fact that the deformable layers fail to optimally distribute the rider's weight over the largest possible area. Such deformable padding layers, which rely on varying the amounts and properties of the padding in specific areas of the saddle to maximize comfort, fail to accommodate the wide variety of different riding positions, as the padding placements are necessarily optimized for only one position. The result is that riders frequently feel extreme discomfort while riding, to the point that many quit the sport.

Reducing padding to reduce weight comes primarily at the expense of comfort. Modern saddles also act as an additional clothing layer, and fail to provide adequate ventilation for the rider. Modern saddles, particularly gel designs, may wear around their edges with normal use. Crashing tends to accelerate this wear.

U.S. Pat. No. 5,597,202 (Andersen) teaches a modern saddle as a slung fabric bicycle seat, where the seat is slung in the style of a hammock or director's chair, limiting the direction and amount of tension, if any, that can be applied to the fabric. U.S. Pat. No. 5,927,802 (Kesinger) teaches a modern saddle having a flat, inelastic suspended platform upon which padding is placed to provide cushioning. Neither these nor the previously cited patents teach stretching a membrane into a shape conducive to use as the primary seating surface of a bicycle saddle.

While partially addressed by modern saddles such as the design disclosed in U.S. Pat. No. 6,244,655 (Minkow et al.), the issue of designing anatomically proportioned ("ergonomic") saddles remains difficult. By virtue of their load support mechanisms, both leather and modern saddles are generally limited in their ability to optimally distribute the rider's weight. For example, leather, due to its inelasticity, tends to create "hot spots" under the rider's perineum and ischial tuberosities or ischium ("sitz bones"), resulting in, respectively, numbness in the crotch and soreness around the sitz bones. Various medical studies have indicated that this situation can lead to impotence in men. Other problems attributed to the compression of the perineum in men include nerve damage, cavernosal artery insufficiency, and site specific vaso-occlusion.

Modern ergonomic saddles reduce the perineal pressure by increasing the load on the sitz bones. However, due to the previously mentioned limitations, modern saddles do not tend to distribute loads well, and further discomfort in the sitz bone area typically results.

Both traditional and modern saddles also have in common a heavy appearance due to the opacity of the seating surface. As the bicycle industry is very concerned with aesthetics, this is a significant issue.

Due to the aforementioned shortcomings, saddles are among the most frequently replaced bicycle components.

There are a number of needs and desires, which have been mentioned above, and include the following: it is desirable for a bicycle saddle to be light-weight, a bicycle saddle should be aesthetically appealing and look light-weight, a bicycle saddle needs to be comfortable to ride, a bicycle saddle should be ergonomic, accommodating to the rider's specific anatomy and distributing body weight comfortably, a bicycle saddle should provide good aeration to the rider, a bicycle saddle should be inexpensive to manufacture, mechanically robust, and wear well.

SUMMARY OF THE INVENTION

The invention addresses at least the needs and desires discussed in the background to the invention.

The invention includes a bicycle saddle whose seating surface is made of a stretched membrane, where the membrane is stretched into a vaulted shape from the nose generally extending at least partially toward the cantle at the rear of the seat.

The invention further includes one or more carrier members acting upon the membrane to create, at least partly, the vaulted shape, and an attachment of at least part of a perimeter of the membrane to one or more of the carrier members. The attachment may provide the vaulted shape to the membrane and/or a tension to the membrane.

The invention also further includes a saddle undercarriage attached to one or more of the carrier members, and may provide at least part of the tension to the membrane, when the saddle undercarriage is flexed. The saddle undercarriage may further include a means for mounting to a seat post.

In some embodiments, the invention includes a ventilation path through the seating surface to the rider.

The membrane is preferably primarily composed of one or more of the following: elastomeric materials and textiles, including woven fabrics composed primarily of elastomeric materials. The membrane material preferably exhibits minimal creep, thereby maintaining its shape and tension for extended periods of time. In other embodiments, the membrane may be primarily composed of a molded elastomer having hole patterns to provide ventilation and/or to provide variable tensioning.

The carrier member(s) may be made of a thermoplastic material, which may further be glass-filled. The carrier member(s) may be attached to the membrane using one or more of the following, but not limited to, encapsulation molding, adhesive bonding, stitching, riveting, threaded fasteners, or capturing between two capturing members. In some embodiments, the carrier member(s) may be attached to the entire perimeter of the membrane.

The invention also includes the carrier member(s) at least partly providing tension to the membrane. The invention may further include the membrane being variably tensioned by the carrier member(s) and/or saddle undercarriage. This variable tensioning may be used to reduce the pressure created by the saddle surface on the rider's perineum to achieve increased comfort and optimal anatomical fit without compromising the saddle's weight. In some embodiments invention includes the variable tensioning achieved by variations in the weave of a woven fabric membrane. The variable tensioning feature of the invention shows great promise in reducing health risks to men.

The invention includes bicycle saddles having greatly reduced parts count relative to other suspended saddle designs, inherently reducing the cost of manufacture.

The invention includes bicycle saddles having abrasion and/or tear resistant edges, reducing susceptibility to wear in the course of normal usage or crashing.

The invention includes alternate saddle configurations including multiple stretched membranes providing halves of a saddle and forming a gap between those halves to accommodate the rider's anatomy, or a perimeter indentation in the stretched membrane designed to accommodate the rider's anatomy.

Another embodiment of the present invention includes a rider replaceable carrier/membrane assembly.

Another embodiment of the present invention provides an additional padding layer, or muffin, such as foam rubber or gel. The muffin may be attached to the top of the membrane using over-molding, lamination, chemical, mechanical bonding, or other methods commonly known to those skilled in the art. Alternatively, the muffin may be positioned between the membrane and the carrier member, situated near the cantle or the nose of the saddle.

A preferred embodiment of the invention includes a one-piece, continuous carrier member formed by encapsulation molding of thermoplastic about the perimeter of an elastomeric woven fabric membrane that is pre-tensioned. This carrier/membrane assembly is then attached via conventional methods such as threaded fasteners to a saddle undercarriage providing mechanical support and tensioning to the carrier/membrane assembly and rails for mounting to a standard bicycle seat post.

The invention also includes a method of providing a bicycle seating surface by providing a vaulted shape by stretching the membrane(s) with at least one carrier member from essentially the nose at least partially toward the cantle. The method may also include one ore both of the following: (1) providing a membrane tension adjustment by adjusting an attachment of the membrane with at least one of the carrier members, and (2) providing a first membrane tension near a rider perineum contact area distinct from the membrane tension away from the rider perineum contact area.

The invention's method further includes one or more of the following: (1) replacing the membrane to provide the vaulted shape by stretching at least one replacement membrane with at least one replacement carrier member, (2) providing the tension adjustment for the replacement membrane by adjusting a second attachment of the at least one replacement membrane with at least one of the carrier members, (3) providing at least part of the adjustment of the membrane tension by adjusting an attachment of a saddle carriage to the carrier member, (4) providing at least part of the tension to the membrane, when the saddle undercarriage is flexed.

Other preferred embodiments of the invention include the dimensions, materials, and other features or characteristics of the invention modified to accommodate the specific and distinct needs of comfort for distinct riders, exercise bicycles, road bicycles, mountain bicycles, hybrid bicycles, and other variations known to those skilled in the art.

The invention preferably provides a lightweight, comfortable, ventilated, aesthetically pleasing bicycle saddle that is robust and readily manufactured. Other features and advantages of the present invention will be apparent from the accompanying drawings and from the detailed description that follows.

DETAILED DESCRIPTION OF THE INVENTION

Figure 1:
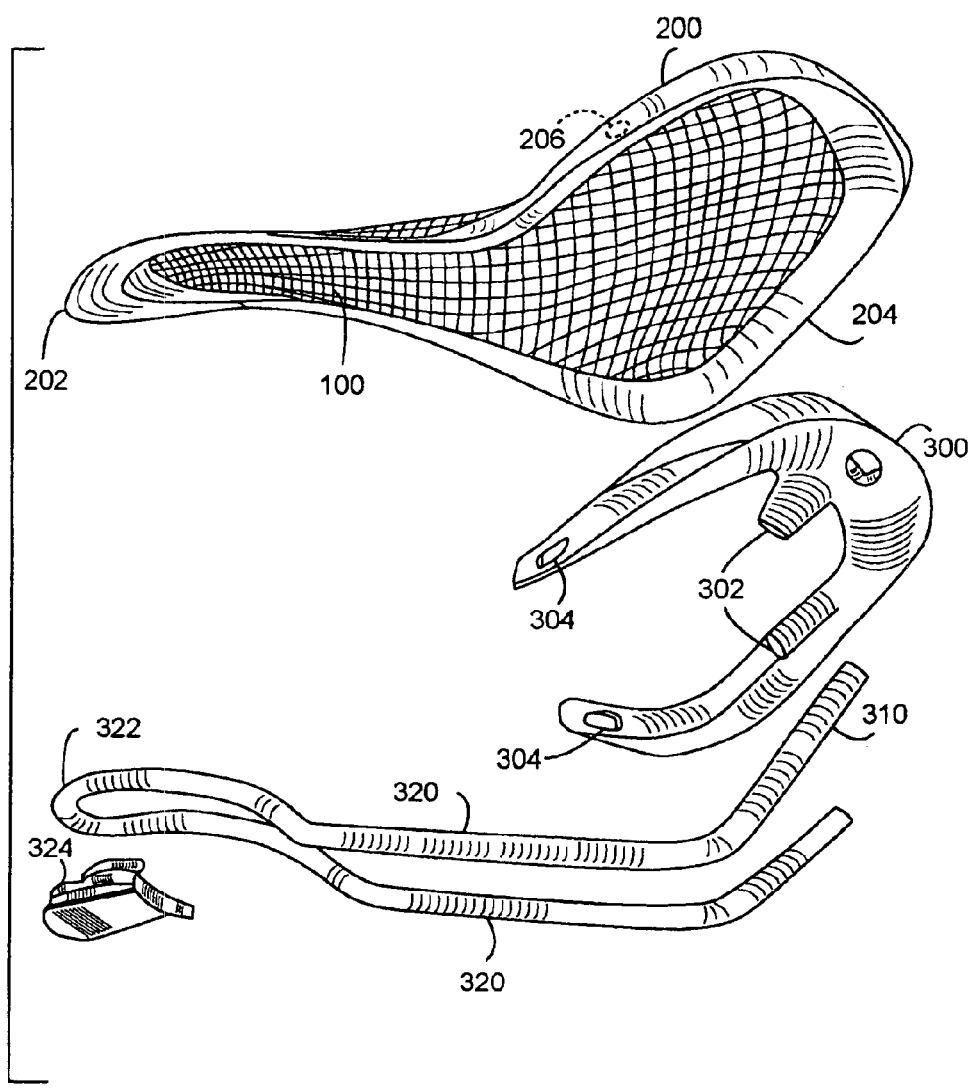
FIG. 1 illustrates an exploded view of the components of certain preferred embodiments of the invention.

The invention includes a bicycle saddle whose seating surface is made of a stretched membrane, where the membrane is stretched into a vaulted shape whose cantle or rear supports the rider's buttocks and whose nose extends through the rider's crotch.

The membrane, which may also be referred to as a web or webbing, may be fabricated of materials including elastomeric materials and textiles, including woven fabrics composed primarily of elastomeric materials. The membrane material preferably exhibits minimal creep, thereby maintaining its shape and tension for extended periods of time. In alternate embodiments, the membrane may also be primarily composed of a molded elastomer having hole patterns to provide ventilation and/or provide variable tensioning.

The following terms are used herein and include the following definitions:

Membrane: A web or sheet of material that returns to its original shape when any applied force is removed. Materials used to fabricate the membrane may include, but are not limited to, the following: textiles and woven fabrics, including woven fabrics including elastomeric materials, elastomeric sheets, including sheets manufactured to provide ventilation between the two sides of the sheet.

Carrier: A structure, preferably plastic, used to capture a membrane. The capturing means may be any typically known to those skilled in the art, including, but not limited to, encapsulation molding, adhesive bonding, or any of a number of known mechanical fasteners.

Elastomers: Materials that exhibit a high degree of rubber-like elasticity.

Thermoplastic elastomers: Polymeric compositions which soften or melt at elevated temperatures, permitting them to be fabricated into a shape, which when cooled, retains the original physical and chemical properties the compositions had before heating.

Encapsulation, Encapsulated: The attachment of a plastic carrier member about a membrane such that the plastic material flows and becomes intimately secured with the membrane. Preferably, the carrier member and membrane materials are chosen to form a chemical bond between the membrane and carrier member after encapsulation attachment.

Saddle undercarriage: The mechanical part or assembly to which the carrier member(s) are attached and which attaches to the seat post of a bicycle. In some embodiments, the saddle undercarriage and the carrier member(s) are a single unitary item.

Vaulted: In the shape of an arch, having cross-section that is concave when viewed from below for at least the region distant from a rider's perineum and under the rider's crotch.

Cantle: The rear or tail area of a bicycle saddle.

Nose: The front or nose area of a bicycle saddle.

Muffin: A material generally positioned between the membrane and other structures.

The invention includes one or more carrier members attached to at least part of the perimeter of the membrane providing, at least in part, the vaulted shape. The carrier members may be made of a thermoplastic material, which may further be glass-filled. The carrier members may be attached to the entire perimeter of the membrane. The invention also includes the carrier member(s) at least partly providing tension to the membrane.

A preferred embodiment of the invention includes a one-piece, continuous carrier member formed by encapsulation molding of a thermoplastic about the perimeter of an elastomeric woven fabric membrane that is pre-tensioned. This carrier/membrane assembly is then attached via conventional methods to a saddle undercarriage providing mechanical support and tensioning to the carrier/membrane assembly and rails for mounting to a standard bicycle seat post.

Figure 2:
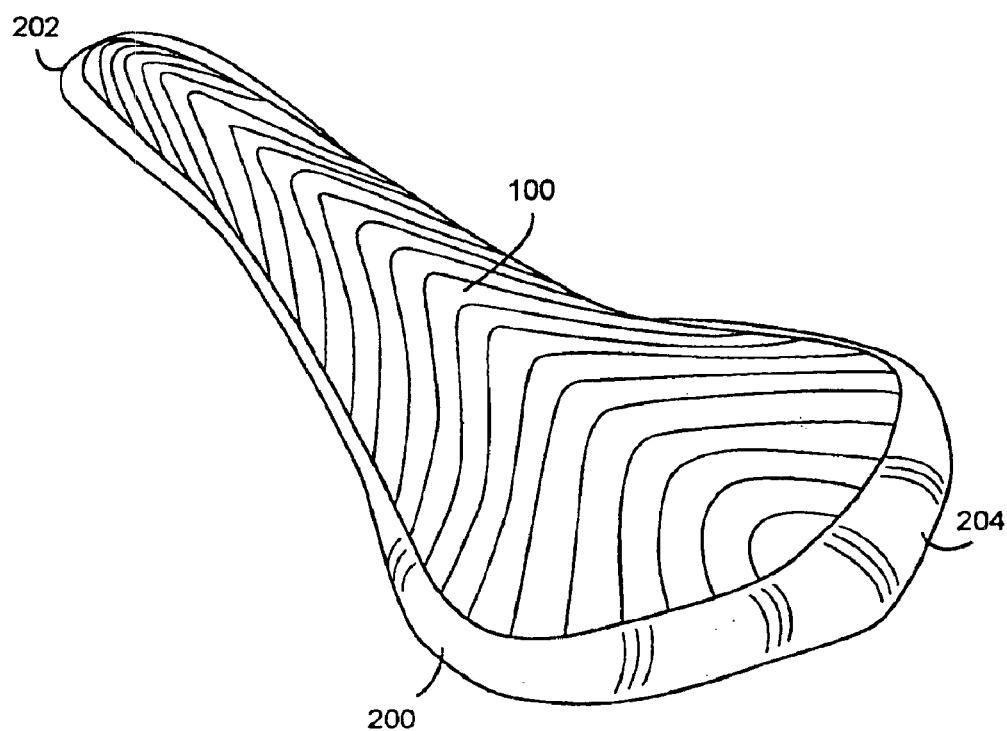
FIG. 2 illustrates an assembled top perspective view of the invention as illustrated in FIG. 1.

FIG. 1 illustrates an exploded view of the components of preferred embodiment of the invention. FIG. 2 illustrates an assembled view of the invention as illustrated in FIG. 1. The membrane 100 may be stretched by carrier member 200 and assembled to saddle undercarriage comprising elements 300 and 310. This embodiment of the invention provides ventilation directly through the seating surface by using an air permeable membrane. In some preferred embodiments, ventilation is possible through at least 25% of the surface area of the membrane, in more preferred embodiments, ventilation is possible through at least 50% of the surface area of the membrane. In some embodiments, more permeability provides better cooling and comfort. Therefore, it may be beneficial in some embodiments for ventilation to be possible through even greater percentages of the surface area of the membrane. The amount of ventilation allowed may be varied over the surface of the membrane 100 by varying the air permeability of the membrane 100. For example, the weave of a woven membrane 100 may be varied to allow more ventilation in some regions and less ventilation in others.

Encapsulation molding is a preferred method of attaching membrane 100 to carrier member 200. Referring to FIGS. 1 and 2, membrane 100 may be stretched before being placed in an injection mold. In the injection molding process, the carrier member 200 is encapsulation molded about the membrane 100 using thermoplastic, forming a strong bond between carrier member 200 and membrane 100. The thermoplastic is preferably glass filled. Membrane 100 is trimmed as needed after molding. Other materials may be used, for example, in other embodiments carrier member 200 may be primarily composed of metal or other materials with similar properties of strength and flexibility.

In other embodiments, the carriers may be attached to the membrane using one or more of the following, but not limited to, encapsulation molding, adhesive bonding, stitching, riveting, threaded fasteners, or capturing between two capturing members. The carrier members may be of one-piece construction, and there may be as few as one carrier member.

FIGS. 3A to 3L illustrate alternative attachment mechanisms of membrane 200 to carrier member(s) 100 as found in FIG. 1.

Figure 3A:
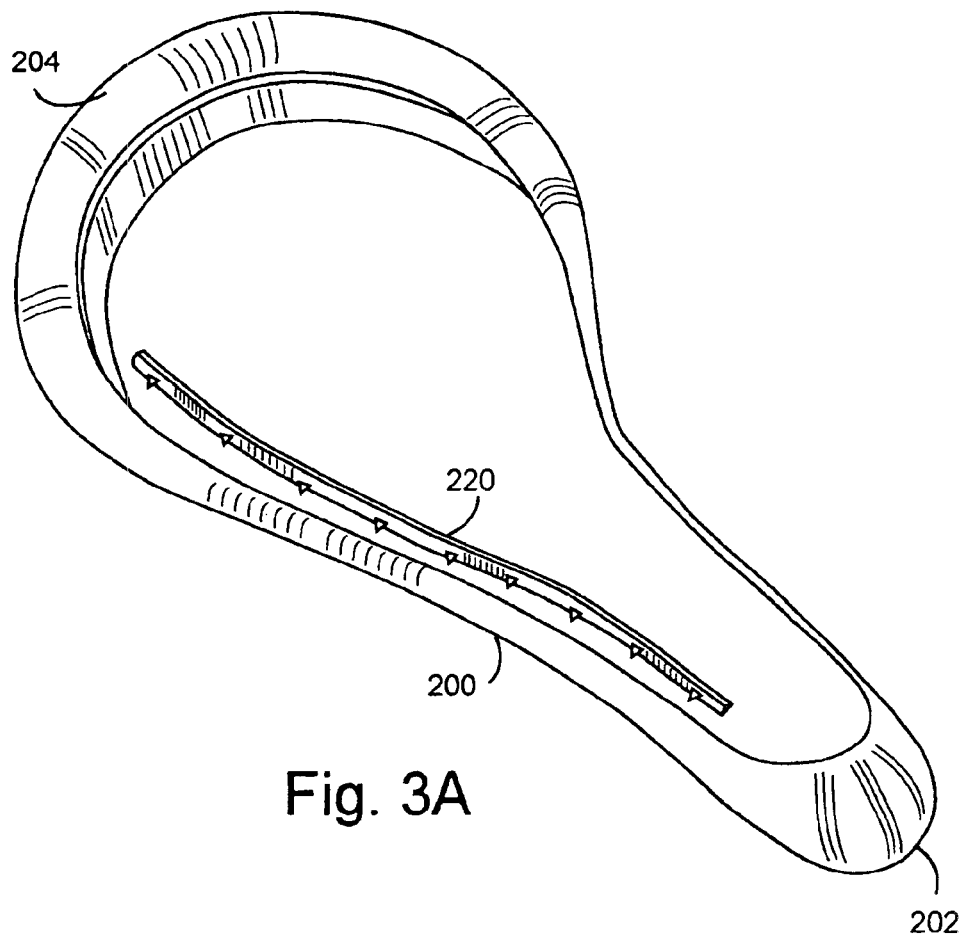
FIG. 3A illustrates two carrier members 200 and 220 to be attached to a membrane 100 of FIGS. 1 and 2 by a capturing means.

FIG. 3A illustrates two carrier members 200 and 220 to be attached to a membrane 100 of FIGS. 1 and 2 by a capturing means, which may include a snap fit coupling system.

Figure 3B:
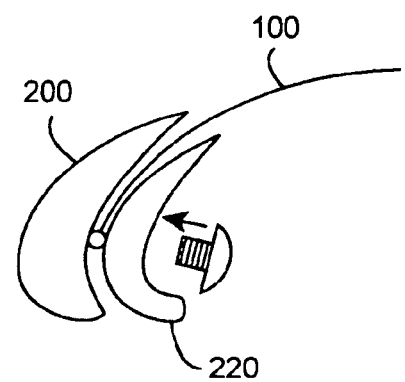
FIG. 3B illustrates two carrier members 200 and 220 to be attached to a membrane 100 by a capturing means based upon mechanical fastening.

FIG. 3B illustrates two carrier members 200 and 220 to be attached to a membrane 100 by a capturing means based upon mechanical fastening.

Figure 3C:
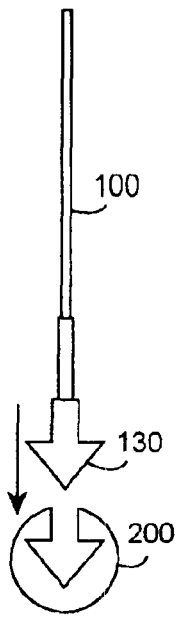
FIG. 3C illustrates a carrier member 200 attaching to membrane 100 using a mechanical fastener 130.

FIG. 3C illustrates a carrier member 200 attaching to membrane 100 using a mechanical fastener 130.

Figure 3D:
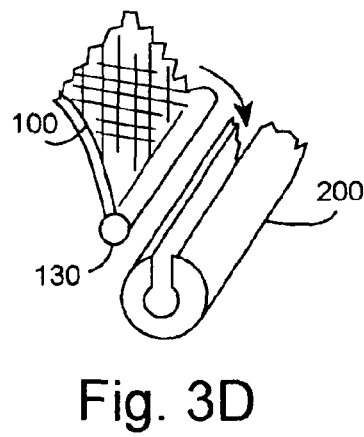
FIG. 3D illustrates a carrier member 200 attaching to membrane 100 using a second mechanical fastener 130.
Figure 3L:
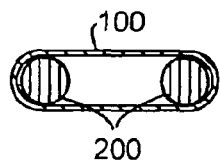
FIG. 3L illustrates sock like membrane 100 slipped over a carrier member 200.
Figure 3K:
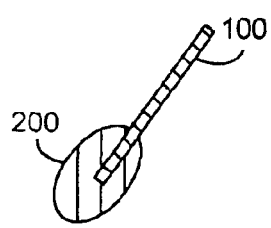
FIG. 3K illustrates a carrier member 200 attaching to membrane 100 by encapsulating the membrane 100 in the carrier member 200.

FIG. 3D illustrates a carrier member 200 attaching to membrane 100 using a second mechanical fastener 130.

Figure 3E:
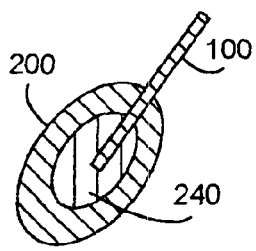
FIG. 3E illustrates a carrier member 200 attaching to membrane 100 using adhesive 240.

FIG. 3E illustrates a carrier member 200 attaching to membrane 100 using adhesive 240.

Figure 3F:
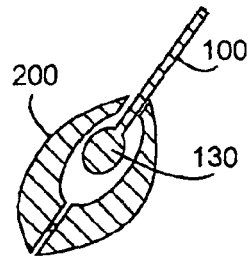
FIG. 3F illustrates a carrier member 200 attaching to membrane 100 using a mechanical fastener 130, where carrier member 200 is fabricated of two parts attached around fastener 130.

FIG. 3F illustrates a carrier member 200 attaching to membrane 100 using a mechanical fastener 130, where carrier member 200 is fabricated of two parts attached around fastener 130.

Figure 3G:
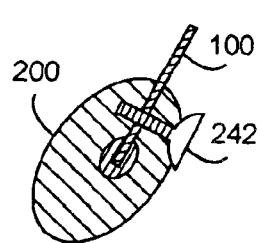
FIG. 3G illustrates a carrier member 200 attaching to membrane 100 using a screw-type mechanical fastener 242.

FIG. 3G illustrates a carrier member 200 attaching to membrane 100 using a screw-type mechanical fastener 242.

Figure 3H:
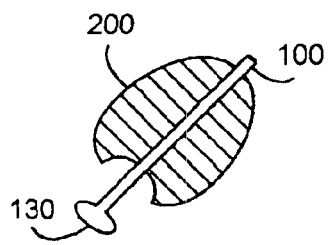
FIGS. 3H and 3I illustrate carrier member 200 attaching to membrane 100 using a mechanical fastener 130.
Figure 3I:
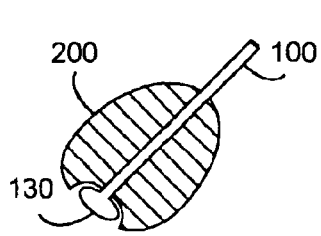
Figure 3J:
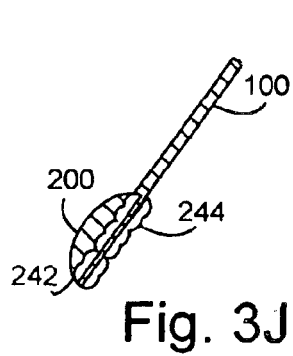
FIG. 3J illustrates a carrier member 200 attaching to membrane 100 by adhesive 242 placed between the carrier member 200 and the membrane 100, and also and adhesive 244 placed on the side of the membrane 100 opposite the carrier member 200.

FIGS. 3H and 3I illustrate carrier member 200 attaching to membrane 100 using another mechanical fastener 130.

In other embodiments, attachment of membrane 100 to carrier members 200 can be achieved with similar results by using different materials, assembly techniques, and bonding techniques than those specifically disclosed.

Membrane 100 can be formed from a pliable material. Preferably, membrane 100 is primarily composed of a fabric made by the Quantum Fabric company, however, many alternate materials may be easily selected by one skilled in the art. As previously discussed, attachment of membrane 100 to carrier member 200 can be done using one or more of the following: adhesive bonding, stitching, riveting, threaded fasteners, or other mechanical fasteners. Some of the possible ways to attach are shown in FIGS. 3A–3D. The pre-stretching of membrane 100 does not require a fixture; it can also be achieved manually. However, it is often preferable to use a fixture to stretch membrane 100.

The attachment of membrane 100 to carrier members 200 results in an assembly that holds its shape, which is that of a seating surface for a bicycle saddle. By virtue of its form and mechanical characteristics, carrier member 200 imparts to membrane 100 a vaulted shape, as well as other features that are conducive to the assembly's use as the seating surface of a bicycle saddle.

For instance, the nose narrows down as it must fit between the rider's legs, and cantle widens out to provide support to the rider's buttocks. The carrier member 200 enables the membrane 100 to hold a tension that was applied to the membrane 100 in the attachment process.

The invention includes a saddle undercarriage assembling to the carrier member(s). The saddle undercarriage may provide tensioning to the carrier member-membrane assembly. The saddle undercarriage may incorporate rails for mounting to the seat post. In FIG. 1, the undercarriage assembly preferably includes a bent rod or tube 310 and a thermoplastic tail 300. Tail member 300 provides two holes 302 into which the ends of rod 310 can be press-fit and/or adhesively attached.

Optional nose member 324 fits into the bend 322 at the end of the rod or tube 310. This assembly is then attached to the carrier member 200 via mating mechanical snap details 304 and 206. The undercarriage assembly provides additional tension both along both the longitudinal and transverse axes of the bicycle saddle. The undercarriage assembly further preferably provides standard rails 320 for attaching to seat posts of the design and dimensions standard to the cycling industry. This saddle undercarriage further provides added structural integrity to the bicycle saddle. The saddle undercarriage must be capable of sustaining the significant loads to which it is subjected during the course of normal use. The nose piece 324 may provide additional shape to the seating surface.

The saddle undercarriage can also be achieved with similar results by using different materials and assembly designs. The undercarriage assembly can be formed from a single piece, instead of several, of plastic or metal or other material of similar or desirable mechanical characteristics. The assembly can also be formed from two rods that mate into a structural nosepiece, as illustrated by FIG. 4A.

In FIG. 1, the undercarriage is preferably assembled to the carrier member 200 via a mechanical snap assembly of two posts 206 on the carrier assembling into mating slots 304 on the frame. The preferred assembly process is inexpensive and reversible with simple tools, making the carrier/membrane assembly replaceable by the rider. Those skilled in the art will appreciate that this assembly step can also be achieved by other means, including but not limited to threaded fasteners, adhesive bonding agents (which may be less preferred), and other similar processes.

Certain embodiments of the invention include multiple carrier members to achieve the desired effects of shaping, tensioning, and load transmission. The invention also includes bicycle saddles having abrasion and/or tear resistant edges, reducing susceptibility to wear in the course of normal usage or crashing.

Figure 4A:
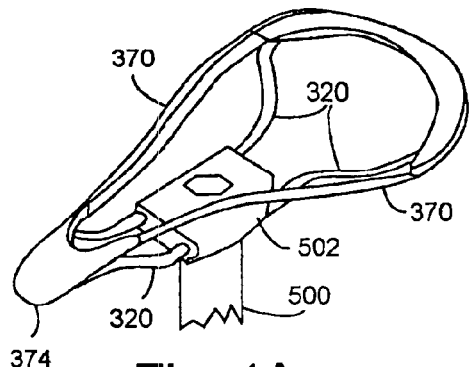
FIGS. 4A and 4B illustrate an embodiment of the invention including multiple carrier members, rear carrier member 372 and front carrier member 374, optionally connected by elastomeric carrier member 370 to provide an edge treatment to membrane 100 edges, that would otherwise be exposed and subject to increased wear.
Figure 4B:
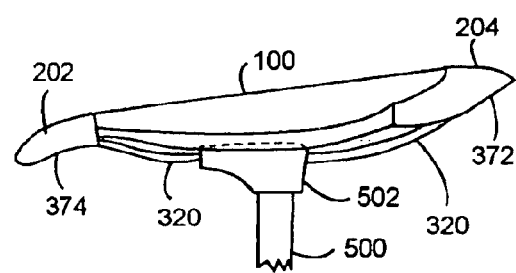

FIGS. 4A and 4B illustrate an embodiment of the invention including multiple carrier members, rear carrier member 372 and front carrier member 374, optionally connected by elastomeric carrier member 370 to provide an edge treatment to membrane 100 edges, that would otherwise be exposed and subject to wear.

The invention as illustrated in FIGS. 4A–4B, limits the amount of longitudinal tension that can be provided to the saddle, but provides shape to the saddle. The longitudinal tension is then re-introduced by attaching this carrier assembly to a saddle carriage 320 similar to that previously described.

The invention includes variably tensioning the membrane by adjusting the carrier(s) and/or saddle undercarriage. This variable tensioning may be used to reduce the pressure created by the saddle surface on the rider's perineum, and to achieve increased comfort and optimal anatomical fit without compromising the saddle's weight. The carrier member(s) and/or saddle undercarriage may be adjusted in a number of known ways to adjust or vary the tension of all of, or portions of, the membrane. The means for adjusting tension may include flexing or bending the carrier member(s) and/or saddle undercarriage.

Another embodiment of the present invention provides the ability of the rider to tension or adjust the desired firmness of the seating surface.

Figure 5:
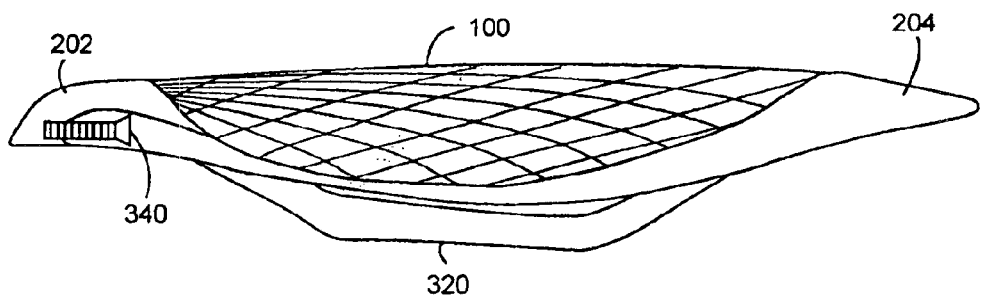
FIG. 5 illustrates another embodiment of the invention providing a rider variable tensioning mechanism 340 as part of the saddle carriage/carrier assembly.

FIG. 5 illustrates another embodiment of the invention providing a rider variable tensioning mechanism 340 as part of the saddle carriage/carrier assembly. The rider variable tensioning mechanism 340 enables riders to adjust for wear and stretch in membrane 200 over time, and to adjust the seating surface tension to their liking. Further, the membrane 200 may be stretched variably during the assembly process to provide added comfort to the rider by focusing the load on areas of the rider's anatomy most suited to load bearing.

Figure 6:
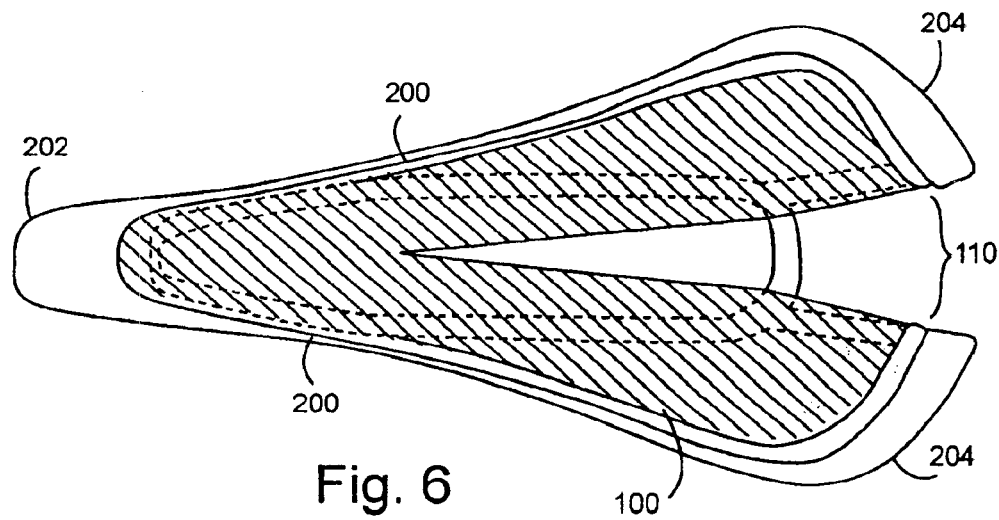
FIG. 6 illustrates an alternative embodiment of the invention including an indented perimeter 110 formed in carrier member 204 and membrane 100.

Another embodiment of the present invention provides a perimeter indentation, or cut out, in the stretched membrane, designed to accommodate the rider's anatomy. For example, FIG. 6 illustrates an alternative embodiment of the invention including an indented perimeter 110 formed in carrier member 204 and membrane 100. The indented perimeter 110 provides pressure relief for the rider's perineal area. This can be achieved through a variety of combinations of the saddle undercarriage and carrier members described earlier. Membrane 100 is preferably encapsulation molded in a one-piece carrier member 200 attached to a saddle carriage 330 built of bent and welded rod.

Another embodiment of the present invention provides multiple stretched membranes, providing halves of a saddle and forming a gap between those halves to accommodate the rider's anatomy. For example, FIG. 7 illustrates an embodiment of the invention with the seating surface including two membranes 100 and 102 with a gap between them 104, providing pressure relief for the rider's perineum.

Figure 7:
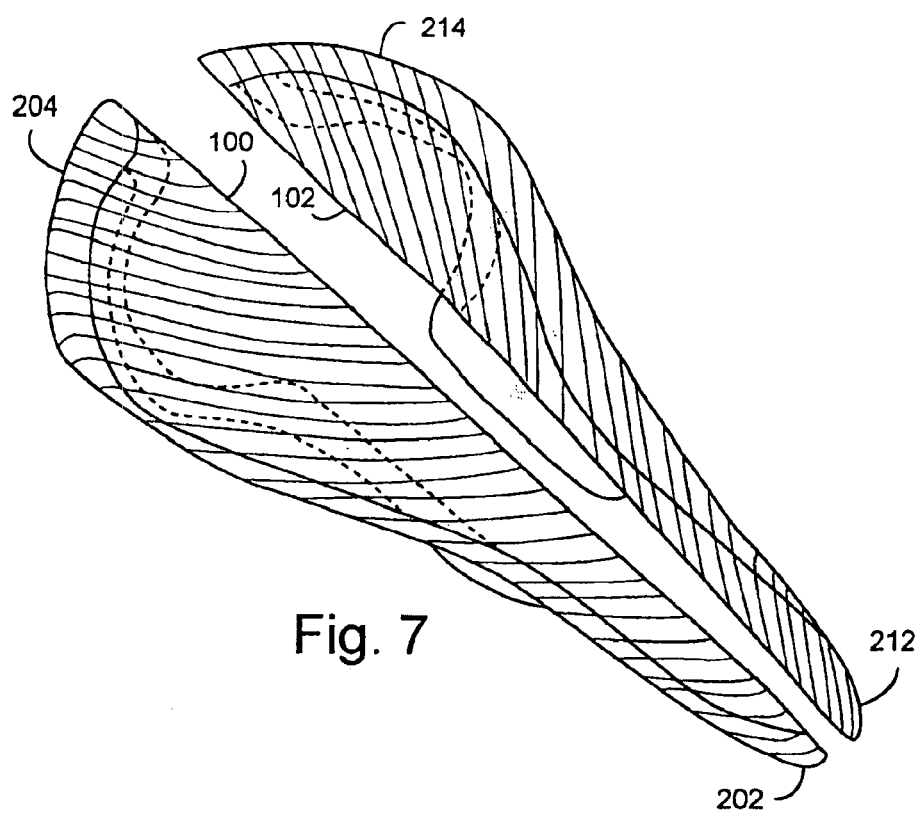
FIG. 7 illustrates an embodiment of the invention with the seating surface including two membranes 100 and 102 with a gap between them 104, providing pressure relief for the rider's perineum.

The embodiment of the invention illustrated in FIG. 7 can be achieved through a variety of combinations of the embodiments of the saddle carriage and carrier members described earlier. In a preferred embodiment, membranes 100 and 102 are encapsulation molded with carrier members 200 and 210. Carrier members 200 and 210 are preferably the mirror image of each other. Carrier members 200 and 210 are then assembled to a saddle undercarriage 320 built of bent rod attached to nose and tail members.

In some embodiments of the configuration shown in FIG. 7, membrane 100 may comprise a sock-like shape, which is slipped over carrier member 204.

Figure 8:
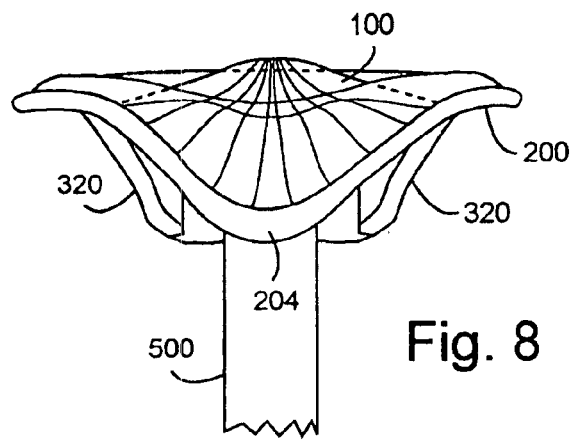
FIG. 8 illustrates an embodiment of the invention wherein the seating surface is formed with a carrier member 200 shaped to provide relief from pressure in the rider's perineum.

In FIG. 8, carrier member 200 includes a "bent" geometry 204 to provide relief from pressure in the rider's perineum. This carrier 200 is then attached to a saddle carriage 320.

Figure 9:
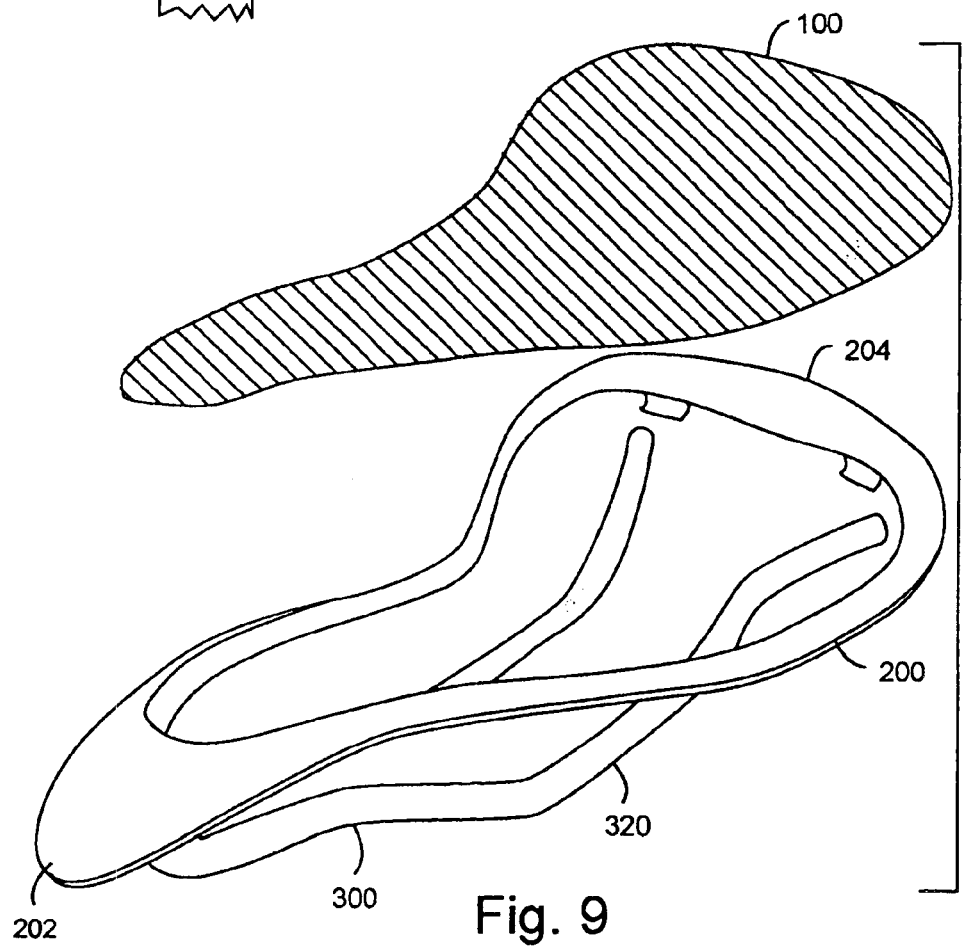
FIG. 9 illustrates an embodiment of the invention including bicycle saddles with a greatly reduced parts count relative to other suspended saddle designs, inherently reducing the cost of manufacture.

One feature of some embodiments is the provision of bicycle saddles with a greatly reduced parts count relative to other suspended saddle designs, inherently reducing the cost of manufacture. The saddle shown in FIG. 9 is an example of a reduced part count embodiment wherein membrane 100 is attached to a single carrier member 200. The seating surface formed by membrane 100 and carrier member 200 is then attached to saddle carriage 300 including rails 320 for attaching to a standard bicycle seat post. The ends 310 of saddle carriage 300 attach, by at least a pressure fit, to mounts 302. The attachment of saddle carriage 300 to carrier member 200 assembled with membrane 100 provides additional tension to the seating surface.

Many embodiments of the invention may provide ventilation directly through the seating surface. For example, the membrane may be characterized by a selected air permeability to increase air flow to the region of the rider in contact with the saddle. In some embodiments, the saddle may include structures intended to direct air flow through the membrane 100. Each of the embodiments seen in FIGS. 2, 6A, 7, 8, 9, 10, and 13, and, possibly others, could include this ventilation feature.

Figure 10:
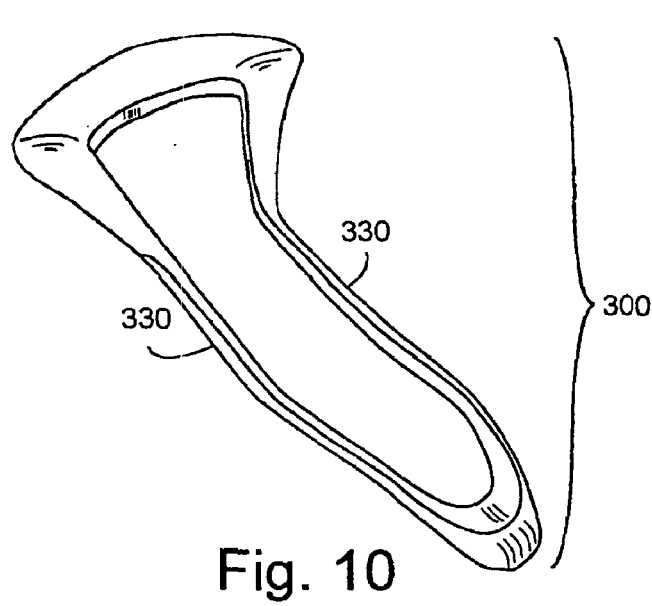
FIG. 10 illustrates an embodiment of the invention with a saddle carriage 300 consisting essentially of a metal piece, preferably forged into its shape, preferably providing rails 330 as a means for mounting to a bicycle seat post.

FIG. 10 illustrates an embodiment of the invention with a saddle carriage 300 consisting essentially of a metal piece, preferably forged into its shape, preferably providing rails 330 as a means for mounting to a bicycle seat post.

Another embodiment of the present invention provides an additional padding layer, such as foam rubber or gel, attached to the top of the membrane using over-molding, lamination, chemical, mechanical bonding, or other methods commonly known to those skilled in the art.

Another embodiment of the invention provides an additional padding layer, or muffin, between the membrane and the carrier member, and/or between the membrane and the undercarriage, typically situated near the cantle. In some embodiments, the attachment of the muffin may be as a layer between the membrane and carrier member as part, at least locally, of the attachment of the membrane and carrier member.

Figure 11B:
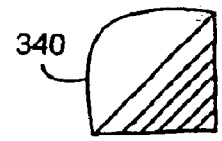
FIG. 11B illustrates a cross section of muffin 340 between attachment inserts.
Figure 11C:
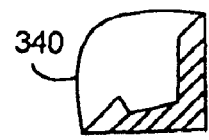
FIG. 11C illustrates a cross section of muffin 340 through an attachment insert.
Figure 11A:
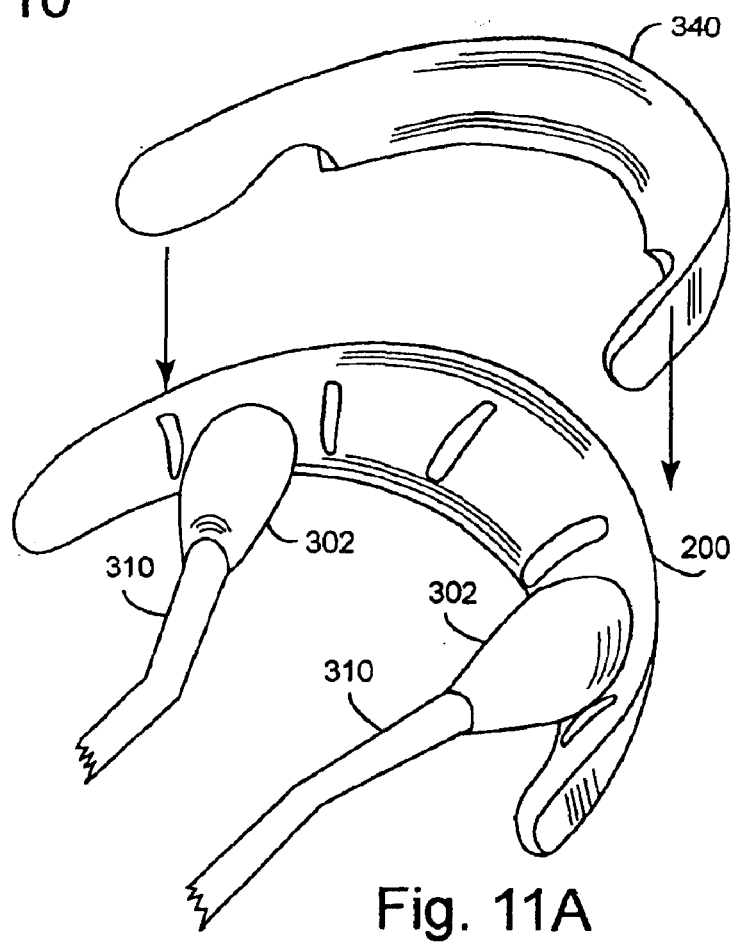
FIG. 11A illustrates an embodiment of the invention including a muffin 340 with attachment inserts situated between membrane 100 and carrier member 200, where attachment inserts on muffin 340 face carrier member 200.

FIG. 11A illustrates an embodiment of the invention including a muffin 340 with attachment inserts situated between membrane 100 and carrier member 200, where attachment inserts on muffin 340 face carrier member 200. FIG. 11B illustrates a cross section of muffin 340 between attachment inserts. FIG. 11C illustrates a cross section of muffin 340 through an attachment insert.

The invention includes the variable tensioning achieved by variations in the weave of a woven fabric membrane.

Figure 12:
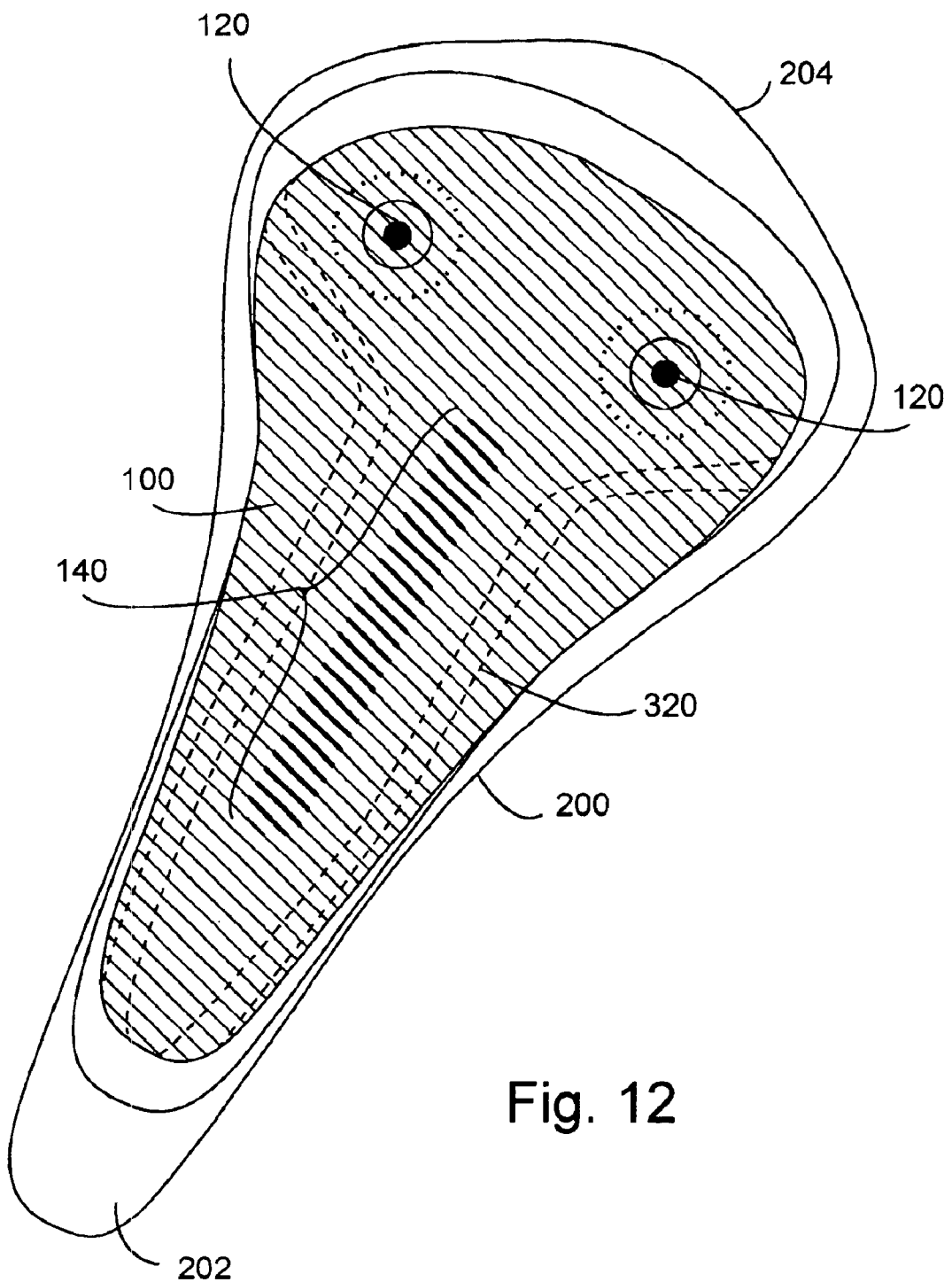
FIG. 12 illustrates contact regions 120 of a rider's sitz bones, which have a different tension to relieve rider's soreness; and also region 140 which may have a different tension or which may be pulled down away for the rider to form a depression, in certain embodiments of the invention.

FIG. 12 illustrates contact regions 120 of a rider's sitz bones, which have a different tension from other portions of the membrane 100 to relieve rider's soreness, in certain embodiments of the invention.

In addition, contact region 140 may also have a different tension form other portions of the membrane 100. The change in tension may be accomplished by means including, but not limited to, varying the tension applied to the membrane, varying the weave or kind of material used in the membrane in selected regions, and by forming holes in the membrane in selected regions. Alternatively, region 140 may comprise a region that has been pulled downward to provide a depression that accommodates a rider's anatomy. A depression may be formed in region 140 in a number of acceptable ways. For example, an element of any desired shape may be attached to the underside of the membrane 100, woven into the membrane 100 or positioned on the top surface of the membrane 100. Then the element may be pulled downward to create a depression by lines attached at one end to the element. The shape of the depression may be controlled by the shape of the element, and the amount of force applied by the lines. The ends of the lines opposite the element may be attached to anchoring structures such as the undercarriage.

Figure 13:
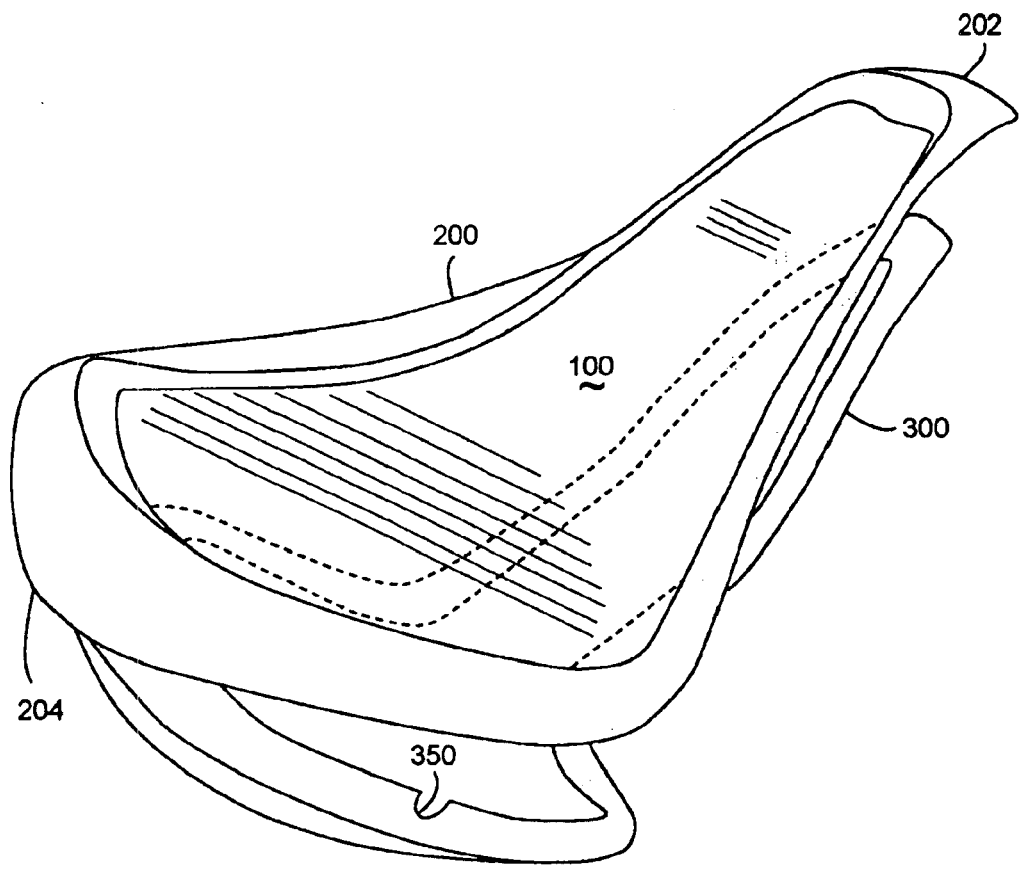
FIG. 13 illustrates a seating surface of the invention made of membrane 100 attached to carrier member 200 which can be readily removed and replaced with regards to saddle carriage 300, preferably using carriage notch 350.

Another embodiment of the present invention provides a rider replaceable carrier/membrane assembly. For example, FIG. 13 illustrates a seating surface of the invention made of membrane 100 attached to carrier member 200 which can be readily removed and replaced with regards to saddle carriage 300, preferably using carriage notch 350.

Figure 14:
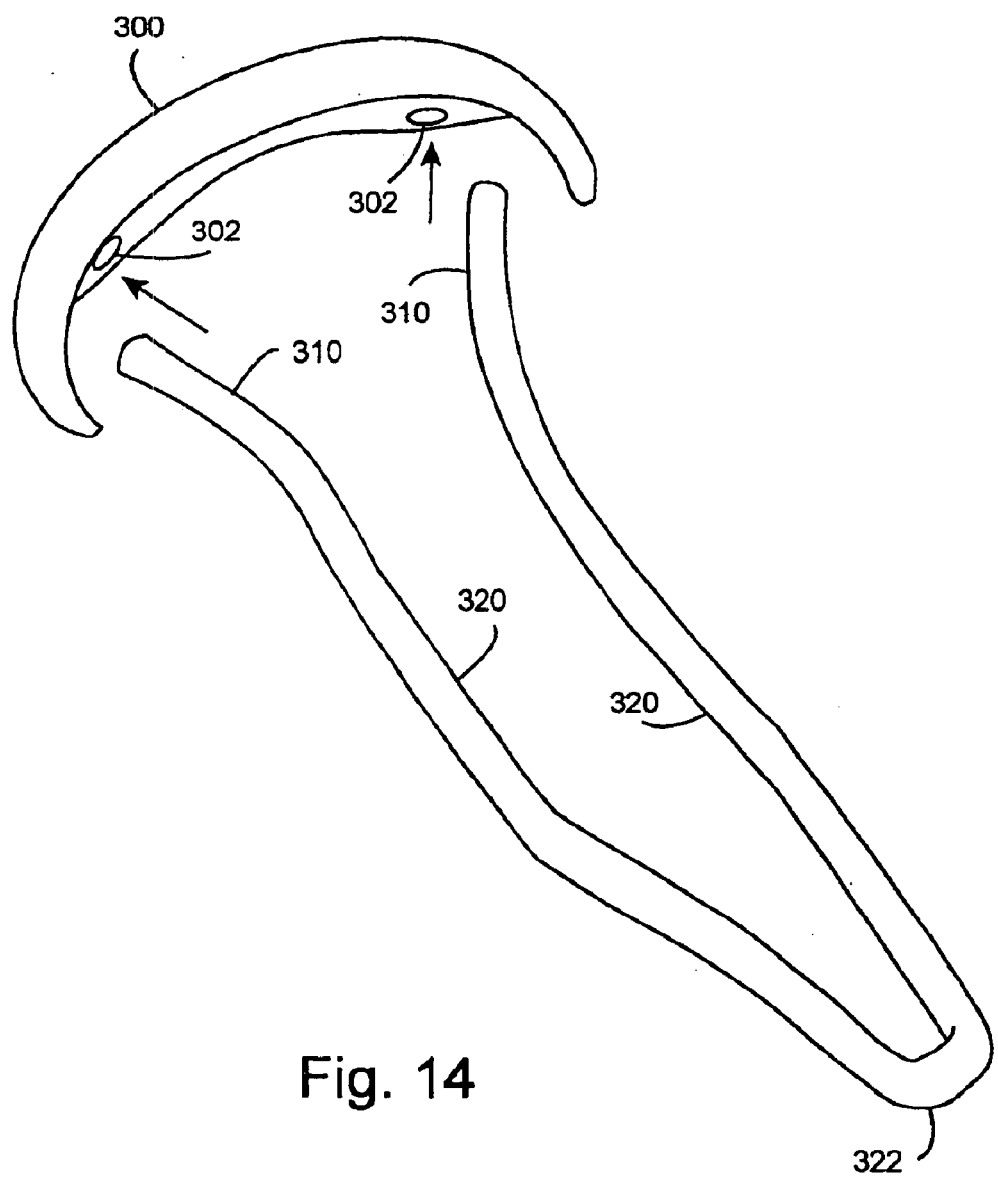
FIG. 14 illustrates an embodiment of the invention forming a saddle carriage including one preferably metallic tube with ends 310, rails 320 and nose attachment area 322, to be at least press fit into attachment member 300 with attached slots 302.

FIG. 14 illustrates an embodiment of the invention forming a saddle carriage including one preferably metallic tube with ends 310, rails 320 and nose attachment area 322, to be at least press fit into attachment member 300 with attached slots 302.

The method of making a bicycle saddle in accord with the invention may include the step of stretching the at least one membrane with at least one carrier member to provide a vaulted shape from essentially the nose at least partially toward the cantle.

The method may further include the step of adjusting an attachment of at least one membrane with at least one of the carrier members to provide a desired tension for the membrane. In some embodiments, this step may be accomplished by adjusting the membrane tension by adjusting an attachment of a saddle carriage. In still other embodiments, the method may include the step of providing at least part of the tension to the membrane, when the saddle undercarriage is flexed.

The method may also include the step adjusting the tension of the membrane near a rider perineum contact area of the saddle distinct from the membrane tension away from the rider perineum contact area of the saddle.

The method may include the step of replacing the membrane by stretching at least one replacement over the carrier member, and this method may further include the step of adjusting a tension for the replacement membrane.

In some embodiments, the method may include the step providing a ventilation path through at least part of the membrane.

Other preferred embodiments of the invention include the dimensions, materials, and other embodiments of the invention modified to accommodate the specific and distinct needs of comfort that distinct riders, exercise bicycles, road bicycles, mountain bicycles, hybrid bicycles, and other variations known to those skilled in the art.

The preceding embodiments have been provided by way of example and are not meant to constrain the scope of the following claims.

What is claimed is:

1. A bicycle saddle, comprising:
   a seating surface including
   at least one membrane,
   stretched into a vaulted shape from a nose extending toward a cantle supporting the buttocks of a rider seated on the saddle;
   wherein said vaulted shape extends at least partially through the crotch of the rider seated on the saddle;
   wherein said membrane comprises an indented perimeter near said cantle.

2. The apparatus of claim 1, wherein said membrane comprises at least one member of an elastomeric material, a textile, a woven fabric, and a membrane including a plurality of apertures formed therein.

3. The apparatus of claim 1, further comprising: at least one carrier member acting upon said membrane to at least partially create said vaulted shape.

4. The apparatus of claim 3, wherein said seating surface further includes at least one muffin between said at least one membrane and carrier member.

5. The apparatus of claim 3, further comprising an attachment of at least part of a perimeter of said membrane to at least one of said carrier members to at least partially provide at least one of said vaulted shape to said membrane and a tension to said membrane.

6. The apparatus of claim 5, wherein said attachment of at least part of said membrane perimeter to said carrier member is selected from one or more of the group consisting of:
   at least one encapsulation molding attaching said at least part of said membrane perimeter to said carrier member;
   at least one adhesive bonding attaching said at least part of said membrane perimeter to said carrier member;
   at least one stitching attaching said at least part of said membrane perimeter to said carrier member; and
   means for capturing said at least part of said membrane perimeter between at least two of said carrier member;
   wherein said capturing means includes at least one member of the collection comprising: means for encapsulation molding, means for adhesive bonding, and means for mechanical fastening.

7. The apparatus of claim 5, wherein said seating surface includes a first membrane and a second membrane, both of said membranes being stretched into said vaulted shape from said cantle to said nose.

8. The apparatus of claim 7, wherein said first membrane supports the right buttock of the rider, and wherein said second membrane support the left buttock of the rider.

9. The apparatus of claim 8, further comprising a saddle undercarriage, said saddle undercarriage further comprising a seat post mount.

10. The apparatus of claim 5, further comprising a saddle undercarriage attached to at least one of said carrier members providing at least part of said tension to said membrane, when said saddle undercarriage is flexed, said saddle undercarriage further comprising a means for mounting to a seat post.

11. The apparatus of claim 10, wherein said saddle undercarriage comprises a formed assembly collection comprising a formed piece attached to a mating member collection.

12. The apparatus of claim 11, wherein said saddle undercarriage further includes:
   said formed piece formed into a shape that is narrow near said nose where at least two ends of said formed piece meet, at least two rails for attaching said seat post extending toward said cantle, and a rear section with at least two loops supporting said cantle;
   a front of said mating collection members attached to said formed piece providing a means for fastening to said nose; and
   a rear of said mating collection members attached to said formed piece providing a means for fastening to said cantle.

13. The apparatus of claim 12, wherein each of said mating collection members attaches to said metal piece by a member of the collection comprising of said mating collection member being molded over said metal piece, and said mating collection member being assembled to said metal piece.

14. The apparatus of claim 10, wherein said saddle undercarriage providing at least part of said tension to said membrane further comprises said saddle undercarriage attached to said carrier member providing at least part of said tension to said member using a threaded mechanism.

15. The apparatus of claim 14, wherein said means for mounting to said seat post further comprises of at least two rails for mounting to said seat post.

16. The apparatus of claim 10, wherein said saddle undercarriage attached to said carrier member further comprises of at least one member of the collection comprising:
   a means for attaching said carrier member and said membrane to said saddle undercarriage, and provision for removing and replacing said carrier member and said attached membrane.

17. The apparatus of claim 16, wherein said means for attaching includes at least one member of the collection comprising: a threaded fastener, a snap fit, a non-fastening mechanical engagement.

18. The apparatus of claim 1, further comprising an undercarriage assembled to said at least one carrier, and wherein said seating surface further includes at least one muffin between said at least one membrane and said undercarriage.

19. The apparatus of claim 1, wherein said seating surface further includes a membrane collection comprising a first membrane and a second membrane, both of said membrane collection members stretched into said vaulted shape from said cantle supporting said rider buttocks to said nose extending through said rider crotch, wherein said first membrane supports a right buttock of said rider, and wherein said second membrane support a left buttock of said rider.

20. The apparatus of claim 1, further comprising a depression formed in said seating surface by pulling a portion of said membrane toward said undercarriage.

21. The apparatus of claim 19, wherein said first membrane is separated from said second membrane by a gap.

22. The apparatus of claim 21, wherein said gap narrows towards said nose.

23. The apparatus of claim 1, further comprising an indented perimeter attachment attaching at least part of said indented perimeter to said at least one carrier members.

24. The apparatus of claim 1, wherein said indented perimeter is between one half inch and four inches wide with respect to the perpendicular of the axis between said nose and said cantle.

25. The apparatus of claim 1, wherein said indented perimeter extends between one inch and eight inches from said cantle.

26. The apparatus of claim 1, further comprising an ventilation path through said seating surface to said rider.

27. The apparatus of claim 26, wherein said ventilation path is through said membrane.

28. A bicycle saddle comprising:
   at least one carrier,
   an undercarriage attached to said at least one carrier,
   at least one membrane coupled to said at least one carrier, and
   a tension applied to said membrane by said at least one carrier pulling said membrane into a vaulted shape from a nose of said saddle at least partially to a cantle of said saddle, and
   a depression formed in said seating surface by pulling a portion of said membrane toward said undercarriage.

29. The saddle of claim 28, wherein said undercarriage asserts a force on said at least one carrier thereby at least partially providing said tension applied by said at least one carrier to said membrane.

30. A method for adjusting said tension applied to said the membrane of the saddle of claim 29 comprising the step: deforming said undercarriage acting on said at least one carrier.

31. The saddle of claim 28, wherein said tension applied to said membrane varies over a surface of said membrane.

32. The saddle of claim 28, wherein said tension applied to a region of said surface of said membrane is selected to reduce pressure on the sitz bones of the user.

33. The saddle of claim 28, further comprising apparatus for adjusting said tension applied to said membrane.

34. A method for adjusting said tension applied to said the membrane of the saddle of claim 28 comprising the step: deforming said at least one of said at least one carrier.

35. The saddle of claim 28, wherein said tension applied to said membrane varies when at least one of said at least one carrier and said undercarriage are flexed.

36. The saddle of claim 28, further comprising a ventilation path through said membrane.

* * * * *